(12) United States Patent
Hernandez-Sherrington et al.

(10) Patent No.: US 7,512,642 B2
(45) Date of Patent: Mar. 31, 2009

(54) MAPPING-BASED QUERY GENERATION WITH DUPLICATE ELIMINATION AND MINIMAL UNION

(75) Inventors: Mauricio Antonio Hernandez-Sherrington, Gilroy, CA (US); Ching-Tien Ho, San Jose, CA (US); Lucian Popa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 11/326,969

(22) Filed: Jan. 6, 2006

(65) Prior Publication Data

US 2007/0174231 A1 Jul. 26, 2007

(51) Int. Cl.
G06F 17/30 (2006.01)
G06F 7/00 (2006.01)

(52) U.S. Cl. .................... 707/204; 707/104.1; 707/101; 707/102

(58) Field of Classification Search .................. None
See application file for complete search history.

(56) References Cited

U.S. PATENT DOCUMENTS 6,785,673 B1 * 8/2004 Fernandez et al. ............. 707/3
6,826,568 B2 * 11/2004 Bernstein et al. ............... 707/6
6,968,346 B2 * 11/2005 Hekmatpour ............ 707/104.1
2003/0120665 A1 * 6/2003 Fox et al. .................... 707/100
2004/0034651 A1 * 2/2004 Gupta et al. ................ 707/102
2004/0199905 A1 10/2004 Fagin et al.
2005/0125781 A1 6/2005 Swamy et al.

OTHER PUBLICATIONS

"IBM WebSphere Commerce Suite V4.1 for OS/390: First Steps", 232 pages, Mar. 2001 (56 pages extracted). [Online] [Retrieved at] <www.redbooks.ibm.com/redbooks/pdfs/sg245683.pdf>.*
"Translating web data", Popa et al., Feb. 2002 (27 pages). Online retrieved at <ftp://ftp.cs.toronto.edu/cs/ftp/cs/ftp/pub/reports/csri/441/paper.ps>.*

* cited by examiner

Primary Examiner—Kuen S Lu
(74) Attorney, Agent, or Firm—Schmeiser, Olsen & Watts

(57) ABSTRACT

A method and system for generating a query implementing a schema mapping. A mapping M is provided from a schema S to a schema T, where M relates S to T, and M includes a plurality of constraints. Schemas S and T each include one or more elements, and T includes at least one set type element. Mapping M is expressed in terms of at least one nested tuple-generating dependency. A query Q is generated where Q is capable of applying M to an input instance I to result in an output instance J, where I conforms to S, J conforms to T, and I and J satisfy the plurality of constraints. Instance J is in partitioned normal form (i.e., satisfies minimal union semantics) and includes no duplicate element instances.

8 Claims, 9 Drawing Sheets

100

```
src = Rcd [
  departments =
  {
    Rcd [deptno="B01", deptname="PLANNING", mgrno="000020", location="1510 Main St, Lancaster PA, 17608"],
    Rcd [deptno="C01", deptname="INFORMATION CENTER", mgrno="000030", location=null]
  },
  fundings =
  {
    Rcd [fid=1014, amount="42,450", projno="IF1000"],
    Rcd [fid=1015, amount="26,300", projno="IF1000"],
    Rcd [fid=1115, amount="50,000", projno="IF2000"],
    Rcd [fid=1220, amount="36,500", projno="PL2100"],
    Rcd [fid=1221, amount="40,000", projno="PL2100"],
    Rcd [fid=1016, amount="80,000", projno="IF1000"],
  }
  projects =
  {
    Rcd [projno="IF1000", projname="QUERY SERVICES", deptno="C01", prstdate=1982-01-01, prenddate=1983-02-01],
    Rcd [projno="IF2000", projname="USER EDUCATION", deptno="C01", prstdate=1982-01-01, prenddate=1983-02-01],
    Rcd [projno="PL2100", projname="WELD LINE PLANNING", deptno="B01", prstdate=1982-01-01, prenddate=1982-09-15]
  }
]
```

```
src = Rcd [
  departments =
  {
    Rcd [deptno="B01", deptname="PLANNING", mgrno="000020", location="1510 Main St, Lancaster PA, 17608"],
    Rcd [deptno="C01", deptname="INFORMATION CENTER", mgrno="000030", location=null]
  },
  fundings =
  {
    Rcd [fid=1014, amount="42,450", projno="IF1000"],
    Rcd [fid=1015, amount="26,300", projno="IF1000"],
    Rcd [fid=1115, amount="50,000", projno="IF2000"],
    Rcd [fid=1220, amount="36,500", projno="PL2100"],
    Rcd [fid=1221, amount="40,000", projno="PL2100"],
    Rcd [fid=1016, amount="80,000", projno="IF1000"]
  },
  projects =
  {
    Rcd [projno="IF1000", projname="QUERY SERVICES", deptno="C01", prstdate=1982-01-01, prenddate=1983-02-01],
    Rcd [projno="IF2000", projname="USER EDUCATION", deptno="C01", prstdate=1982-01-01, prenddate=1983-02-01],
    Rcd [projno="PL2100", projname="WELD LINE PLANNING", deptno="B01", prstdate=1982-01-01, prenddate=1982-09-15]
  }
]
```

```
tgt = Rcd [
  departments =
  {
    Rcd [department =
      Rcd [deptno="B01", deptname="PLANNING", mgrno="000020", location="1510 Main St, Lancaster PA, 17608",
        projects =
        {
          Rcd [project =
            Rcd [projno="PL2100", projname="WELD LINE PLANNING", prstdate=1982-01-01, prenddate=1982-09-15,
              fundings =
              {
                Rcd [funding = Rcd [fid=1220, amount="36,500"]],
                Rcd [funding = Rcd [fid=1221, amount="40,000"]]
              }
            ]
          ]
        }
      ]
    ],
    Rcd [department =
      Rcd [deptno="C01", deptname="INFORMATION CENTER", mgrno="000030", location=null,
        projects =
        {
          Rcd [project =
            Rcd [projno="IF1000", projname="QUERY SERVICES", prstdate=1982-01-01, prenddate=1983-02-01,
              fundings =
              {
                Rcd [funding = Rcd [fid=1014, amount="42,450"]],
                Rcd [funding = Rcd [fid=1015, amount="26,300"]],
                Rcd [funding = Rcd [fid=1016, amount="80,000"]]
              }
            ]
          ],
          Rcd [project =
            Rcd[projno="IF2000", projname="USER EDUCATION", prstdate=1982-01-01, prenddate=1983-02-01,
              fundings =
              {
                Rcd [funding = Rcd [fid=1115, amount="50,000"]]
              }
            ]
          ]
        }
      ]
    ]
  }
]
```

```
tgt = Rcd [
  departments =
  {
    Rcd [department =
      Rcd [deptno="B01", deptname="PLANNING", mgrno="000020", location="1510 Main St, Lancaster PA, 17608",
        projects =
        {
          Rcd [project =
            Rcd [projno="PL2100", projname="WELD LINE PLANNING", prstdate=1982-01-01, prenddate=1982-09-15,
              fundings =
              {
                Rcd [funding = Rcd [fid=1220, amount="36,500"]]
              }, 
              Rcd [project =
                Rcd [projno="PL2100", projname="WELD LINE PLANNING", prstdate=1982-01-01, prenddate=1982-09-15,
                  fundings =
                  {
                    Rcd [funding = Rcd [fid=1221, amount="40,000"]]
                  }
              ]]
        }
    ]],
    ...
  }
]
```

$Q_{departments}$:
select distinct
  d.deptno as department_deptno,
  d.deptname as department_deptname,
  d.mgrno as department_mgrno,
  d.location as department_location,
  VARCHAR('Sk_projects(' || d.deptno || ',' || d.deptname || ',' || d.mgrno || ',' || d.location || ')') AS SetId0
from src.departments d, src.projects p, src.fundings f
where p.deptno = d.deptno and f.projno = p.projno

⎫
⎬ 602
⎭

$Q_{projects}$:
select distinct
  p.projno as project_projno,
  p.projname as project_projname,
  p.prstdate as project_prstdate,
  p.prenddate as project_prenddate,
  VARCHAR('Sk_fundings(' || p.projno || ',' || p.projname || ',' || p.prstdate || ',' || p.prenddate || ',' || 'Sk_projects(' || d.deptno || ',' || d.deptname || ',' || d.mgrno || ',' || d.location || ')') AS SetId0,
  VARCHAR('Sk_projects(' || d.deptno || ',' || d.deptname || ',' || d.mgrno || ',' || d.location || ')') AS InSet
from src.departments d, src.projects p, src.fundings f
where p.deptno = d.deptno and f.projno = p.projno

⎫
⎬ 604
⎭

$Q_{fundings}$:
select distinct
  f.fid as funding_fid,
  f.amount as funding_amount,
  VARCHAR('Sk_fundings(' || p.projno || ',' || p.projname || ',' || p.prstdate || ',' || p.prenddate || ',' || 'Sk_projects(' || d.deptno || ',' || d.deptname || ',' || d.mgrno || ',' || d.location || ')') AS InSet
from src.departments d, src.projects p, src.fundings f
where p.deptno = d.deptno and f.projno = p.projno

702 {
$Q'_{fundings}$:
  select
    u.InSet as InSet,
    xml2clob(
      xmlelement (name "funding",
        xmlelement (name "fid", u.funding_fid),
        xmlelement (name "amount", u.funding_amount)
    )) as XML
  from $Q_{fundings}$ u 704 {
$Q'_{projects}$:
  select
    u.InSet as InSet,
    xml2clob(
      xmlelement (name "project",
        xmlelement (name "projno", u.project_projno),
        xmlelement (name "projname", u.project_projname),
        xmlelement (name "prstdate", u.project_prstdate),
        xmlelement (name "prenddate", u.project_prenddate),
        xmlelement (name "fundings",
          (select xmlagg (v.XML)
           from $Q'_{fundings}$ v
           where v.InSet = u.SetId0))
    )) as XML
  from $Q_{projects}$ u

FIG. 7A

706 {
$Q'_{departments}$:
select
  xml2clob(
    xmlelement (name "department",
      xmlelement (name "deptno", u.department_deptno),
      xmlelement (name "deptname",u.department_deptname),
      xmlelement (name "mgrno", u.department_mgrno),
      xmlelement (name "location", u.department_location),
      xmlelement (name "projects",
        (select xmlagg (v.XML)
          from $Q'_{projects}$ v
          where v.InSet = u.SetId0))
    )) as XML
from $Q_{departments}$ u 708 {
select xml2clob(
    xmlelement (name "tgt",
      xmlelement (name "departments",
        Table0.XML)
    ))
from
(select xmlagg (u.XML) as XML
from $Q'_{departments}$ u
) as Table0

MAPPING-BASED QUERY GENERATION WITH DUPLICATE ELIMINATION AND MINIMAL UNION

BACKGROUND OF THE INVENTION

1. Technical Field

The present invention relates to a method and system for generating a query implementing a schema mapping.

2. Related Art

A query generated by a conventional schema mapping-based query generation technique is not capable of producing an instance of a target schema that includes no duplicate element instances and satisfies minimal union semantics across multiple data sources. Further, slow query execution time can be caused by nested sub-queries included in a conventionally generated query. Thus, an improved schema mapping-based query generation technique is needed.

SUMMARY OF THE INVENTION

In first embodiments, the present invention provides a method of generating a query implementing a schema mapping in a computing environment, the method comprising:

providing a mapping M from a schema S to a schema T, the mapping M relating the schema S to the schema T, the mapping M including a plurality of constraints, the schema S and the schema T each comprising one or more elements, wherein the schema T includes at least one set type element;

providing at least one nested tuple-generating dependency (nested tgd), wherein the mapping M is expressed in terms of the at least one nested tgd; and generating a query Q capable of implementing the mapping M, the implementing comprising applying the query Q to an input, the applying resulting in an output, the input being any instance I conforming to the schema S, the output being an instance J conforming to schema T, wherein the instance I and the instance J satisfy the plurality of constraints of the mapping M, and the instance J is in partitioned normal form (PNF).

In second embodiments, the present invention provides a system for generating a query implementing a schema mapping in a computing environment, the system comprising:

means for providing a mapping M from a schema S to a schema T, the mapping M relating the schema S to the schema T, the mapping M including a plurality of constraints, the schema S and the schema T each comprising one or more elements, wherein the schema T includes at least one set type element;

means for providing at least one nested tgd, wherein the mapping M is expressed in terms of the at least one nested tgd; and means for generating a query Q capable of implementing the mapping M, the implementing comprising applying the query Q to an input, the applying resulting in an output, the input being any instance I conforming to the schema S, the output being an instance J conforming to schema T, wherein the instance I and the instance J satisfy the plurality of constraints of the mapping M, and the instance J is in PNF.

In third embodiments, the present invention provides a computer program product comprising a computer-usable medium including computer-usable program code for generating a query implementing a schema mapping in a computing environment, the computer program product including:

computer-usable code for providing a mapping M from a schema S to a schema T, the mapping M relating the schema S to the schema T, the mapping M including a plurality of constraints, the schema S and the schema T each comprising one or more elements, wherein the schema T includes at least one set type element;

computer-usable code for providing at least one nested tgd, wherein the mapping M is expressed in terms of the at least one nested tgd; and computer-usable code for generating a query Q capable of implementing the mapping M, the implementing comprising applying the query Q to an input, the applying resulting in an output, the input being any instance I conforming to the schema S, the output being an instance J conforming to schema T, wherein the instance I and the instance J satisfy the plurality of constraints of the mapping M, and the instance J is in PNF.

Advantageously, the present invention provides a technique for generating a schema mapping-based query that eliminates duplicate element instances in the output of the query and merges data in the output according to minimal union semantics.

BRIEF DESCRIPTION OF THE DRAWINGS

FIG. 1 is an example of an instance over a source schema, in accordance with embodiments of the present invention.

FIG. 2 is an example of an instance in partitioned normal form over a target schema, in accordance with embodiments of the present invention.

FIG. 3 is an example of an instance over a target schema, where the instance is not in partitioned normal form, in accordance with embodiments of the present invention.

FIG. 6 depicts queries generated by a first step of the method of FIG. 5, in accordance with embodiments of the present invention.

FIG. 7A depicts a first set of queries generated by a second step of the method of FIG. 5, in accordance with embodiments of the present invention.

FIG. 7B depicts a second set of queries generated by the second step of the method of FIG. 5, in accordance with embodiments of the present invention.

DETAILED DESCRIPTION OF THE INVENTION

1. Overview

Figure 4:
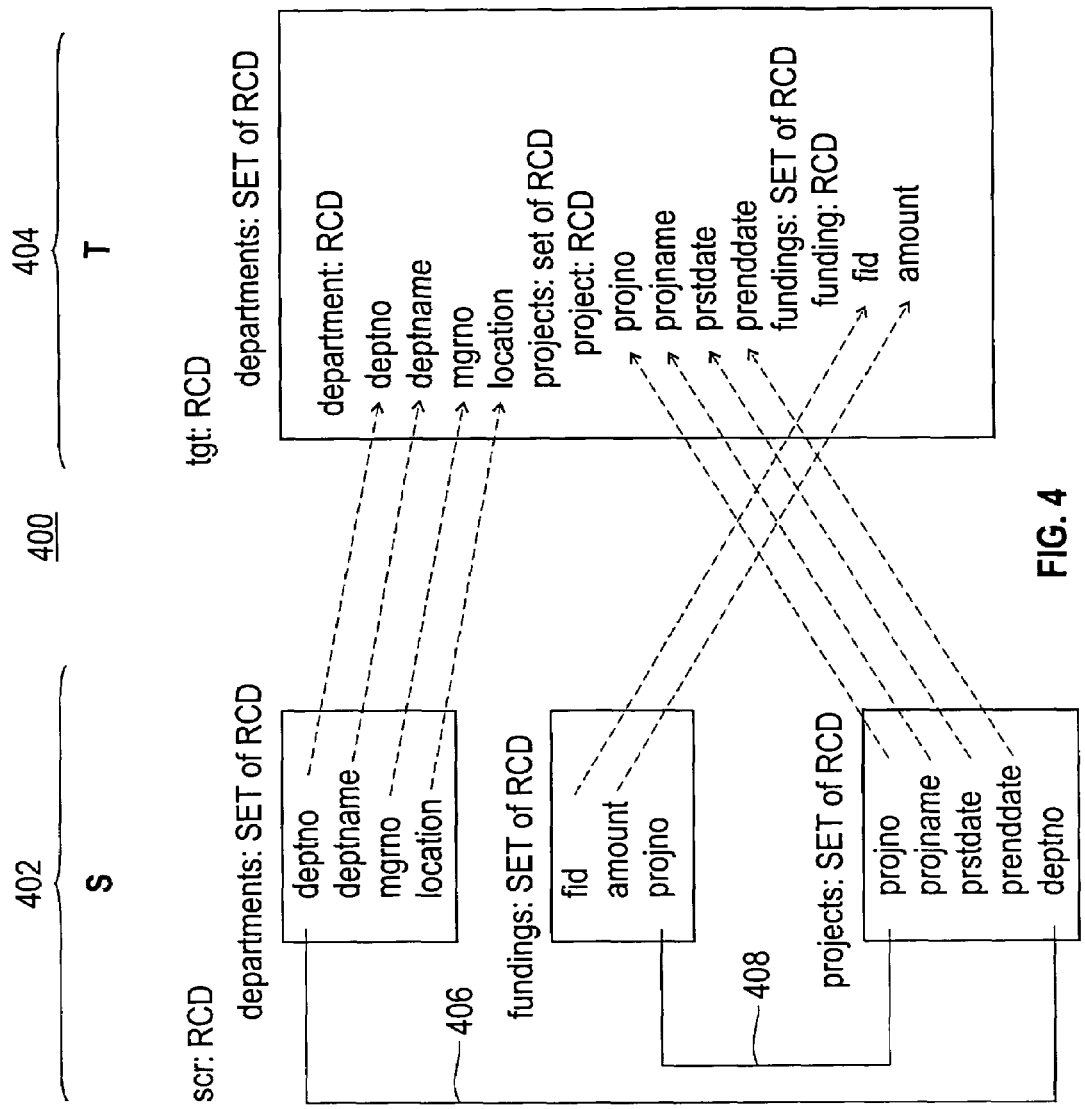
FIG. 4 depicts a schema mapping from a source schema S to a target schema T, in accordance with embodiments of the present invention.

The present invention addresses the problem of generating a query that efficiently and faithfully implements a given schema mapping. This problem is of importance in areas such as information integration where tools need to manipulate, reason about, and implement mappings or data transformations between database and/or eXtensible Markup Language (XML) schemas. Mappings between schemas are usually expressed as constraints in logic-based languages that are able to express how data stored under one schema relates to data stored under another schema. One such language is the language of nested tuple generating dependencies (a.k.a. nested tgds, which are described below). Nested tgds form the basis for the Mapping Specification Language (MSL) used within the Information Integration suite of tools offered by International Business Machines Corporation of Armonk, N.Y.

The present invention describes a system with the following properties:

(1) The system contains an algorithm that, given a schema mapping M, which is expressed as a set of nested tgds, and is between two schemas S and T, generates a query $Q_M$ (a.k.a. query script or transformation script) that implements the mapping M. Schemas S and T are a source schema and a target schema, respectively, and may be any combination of relational and XML schemas. As used herein, implementing the mapping M is defined to mean that the result of $Q_M$ applied to an input instance (i.e., database or document) I over the schema S is an output instance J over the schema T with the property that (I, J) satisfies the constraints expressed by M. If T is an XML target schema, output instance J is an output instance in XML format (a.k.a. output XML instance). Further, if T is a relational target schema, output instance J is an output database.

(2) The algorithm in (1) has the property that the generated query $Q_M$ is partitioned into two parts, one part retrieving a flat representation of output data, which is amenable to fast SQL processing, and the other part producing the output data in a hierarchical format.

(3) The algorithm in (1) has the property that the generated query $Q_M$ eliminates all duplicate element instances at every level in an output XML instance, in the case of an XML target schema, and eliminates all duplicate records in an output database, in the case where the target schema is relational). In an XML instance, two element instances are duplicates of each other if they are identical and moreover have the same parent element instance. In a database, two records are duplicates of each other if they are identical and appear in the same table of the database. As used herein, an "element instance" is an element in an actual XML document, and is distinguished from an "element definition" in an XML schema.

(4) The algorithm in (1) has the property that the generated query $Q_M$ merges data in the output according to the minimal union semantics (i.e., produces an output instance in partitioned normal form (PNF)), which is defined below. According to the minimal union semantics, whenever two element instances with the same atomic components are generated in the target, it is required that the element instances are merged into one by merging corresponding sets of children. Such semantics are useful when data from multiple sources overlaps (i.e., contains fragments of data of the same objects) and these fragments must be assembled at the target. This property is especially important when the target schema is hierarchical (i.e., non-relational).

(5) The algorithm in (1) has the property that the generated query $Q_M$ is in a generic query language that can be directly translated in any external query language that has the ability to remove duplicates (e.g., SQL/XML) or has support for keys (e.g., eXtensible Stylesheet Language Transformations (XSLT)).

2. Basic Terms, Concepts and Notation 2.1 Schemas and Instances

The schemas S and T related by a schema mapping can be any schemas expressed in a language of nested types that include atomic types, record types, choice types and set types. This language is called herein the nested relational schema language, and can encode relational database schemas as well as XML and hierarchical schemas.

Atomic types (a.k.a. primitive types) are the usual data types: String, Integer, Float, Decimal, etc. Record types are used to encapsulate together groups of element definitions (hereinafter, simply "elements"), which in turn can be atomic types or complex types. A complex type is a non-atomic type (e.g., a set, record, or choice type). For example, RCD [ssn: Integer, name: String] represents a record type whose components are ssn (social security number) and name. Another example is RCD [ssn: Integer, person: RCD [name: String, address: String]], where both the first and the second RCD components are of a record type. Set types are used to represent collections of elements or records. For example, SET of RCD [ssn: Integer, person: RCD [name: String, address: String]] represents a collection of records, where each record denotes a person. Choice types are used to represent elements that can be one of multiple shapes. For example, CHOICE [name: String, full_name: RCD [firstName: string, lastName: String]] represents elements that consists of either a name component of type String, or of a full_name component, which consists of firstName and lastName.

A schema is a collection of roots, that is, names with associated nested types. The following are examples of nested relational schemas S and T:

```
S = {src: RCD [departments: SET of RCD [
                  deptno: String,
                  deptname: String,
                  mgrno: String,
                  location: String
                  ],
              fundings: SET of RCD [
                  fid: Integer,
                  amount: String,
                  projno: String
                  ],
              projects: SET of RCD [
                  projno: String,
                  projname: String,
                  deptno: String,
                  prstdate: Date,
                  prendate: Date
                  ]
              ]
    }
T = {tgt: RCD [departments: SET of RCD [
                  department: RCD [
                      deptno: String,
                      deptname: String,
                      mgrno: String,
                      location: String,
                      projects: SET of RCD [
                          project: RCD [
                              projno: Int,
                              projname: String,
                              prstdate: Date,
                              prendate: Date,
                              fundings: SET of RCD [
                                  funding: RCD [
                                      fid: Integer,
                                      amount: String
                                      ]
                                  ]
                              ]
                          ]
                      ]
                  ]
              ]
    }
```

In the two examples presented above, the schemas represent information about departments, projects that take place in each department, and the fundings such projects receive. The first schema has one root, "src", whose type is a record containing three set type elements: "departments", "fundings" and "projects". The second schema has one root, "tgt" and is a reorganization of the first schema, where projects are nested inside each department, and fundings are nested inside each project.

Furthermore, the second schema contains additional labels that do not exist in the first schema. For example, each department record has a name (or label) called "department"; similarly, a project record has a "project" label and a funding record has a "funding" label. The ability to nest labels (e.g., via nesting of record types) is essential for supporting nested tags as in XML data.

Hereinafter, given a schema, any element of set type that is not directly or indirectly nested inside other set type is referred to as a top-level set-type element. For example, in the schema T above, "departments" is a top-level set-type element, while "projects" and "fundings" are not, as "projects" is nested inside the set type associated with "departments", and "fundings" is nested inside the set type associated with "projects."

In a given schema and given an element E whose type is SET of T1, for some type T1, an element A is said to be directly reachable from E if (1) A appears inside T1 and (2) there is no SET type or CHOICE type that is nested inside T1 and that includes A. For example, in the second schema shown above, "project" and "projno" are directly reachable from "projects", but "funding" and "fid" are not directly reachable from "projects", since there is an intermediate SET type, in the latter case.

Given a schema S with roots $r_1$ of type $T_1, \ldots, r_n$ of type $T_n$, an instance I over S is a collection of values $v_1, \ldots, v_n$ for the roots $r_1, \ldots, r_n$ of S, such that for each k from 1 to n, $v_k$ is of type $T_k$. FIG. 1 illustrates an instance I 100 over the schema S shown above, and FIG. 2 illustrates an instance J 200 over the schema T shown above. Hereinafter, schema S shown above and instance I in FIG. 1 are referred to as source schema S and source instance I, respectively. Similarly, schema T shown above and instance J in FIG. 2 are referred to as target schema T and target instance J, respectively.

In the figures, records are shown in the format Rcd [ . . . ], while set values are shown enclosed in { . . . }. Hereinafter, a record may also be referred to as a tuple. As used herein, a record is defined as a container $[A_1=v_1, \ldots, A_n=v_n]$ of several components, each of which corresponds to one element, in XML terms. That is, each $A_i=v_i$ forms an element, where $A_i$ is the name of the element, and $v_i$ is the value. The $v_i$ value can in turn be another record, an atomic value, etc.

The source instance I 100 of FIG. 1 has three top-level sets: a set of two department records, a set of six funding records, and a set of three project records. A top-level set in an instance is a set that is not directly or indirectly nested within another set. In contrast, the target instance J 200 of FIG. 2 has only one top-level set, consisting of two department records. However, each department record of instance J has its own set of project records. For example, department "B01" has a singleton set containing the project "PL2100", while department "C01" has a set of two projects, "IF1000" and "IF2000"). Furthermore, each project record has its own set of funding records.

An instance is said to be in the partitioned normal form (PNF) if there cannot be two records in the same set where the set can occur in any place in the instance, such that the two records have the same atomic components, component-wise, but different set-valued sub-components. An instance in PNF is said to satisfy the minimal union semantics.

For example, the target instance J shown in FIG. 2 is in the partitioned normal form (PNF). In contrast, FIG. 3 depicts an instance J' 300 over the target schema T, where the instance J' is not in PNF. The instance J' is not in PNF because, in the set of projects for the department "B01", there are two distinct "project" records with the same atomic components (deptno, deptname, mgrno and location) but different sets of fundings (i.e., each set contains a different funding record). To obtain the "equivalent" instance that is in PNF, such sets as the above sets of funding records must be merged whenever the parent record is the same. The earlier instance J is an example where such merging has been done.

One main goal of the method described herein is to transform a source instance (e.g., I) into a target instance that is in PNF (e.g., J), based on a schema mapping.

2.2 Schema Mappings

Schema mappings are used to specify relationships between schemas. A schema mapping between schema S and schema T specifies how a database or document instance conforming to S relates to a database or document instance conforming to T. Additionally, a schema mapping can be seen as a specification of how a database or document instance conforming to schema S can be transformed into a database or document instance conforming to schema T.

Schema mappings are expressed in a constraint language called nested tuple-generating dependencies (nested tgds). A schema mapping consists of a set of nested tgds. Each nested tgd is a formula that includes clauses such as: a for clause, an exists clause, a where clause, and a with clause. The for clause identifies source tuples to which the formula applies. The exists clause identifies tuples that must exist in the target. The where clause describes constraints on the tuples of source and/or target. The with clause describes how values in fields of source and target tuples are matched.

Formula m presented below is a nested tgd included in a schema mapping, M, between schemas S and T presented above. FIG. 4 illustrates schema mapping M 400 from source schema S 402 to target schema T 404.

m: for (d in src.departments) (p in src.projects) (f in src.fundings)
    where p.deptno = d.deptno and f.projno = p.projno
  exists (d' in tgt.departments) (p' in d'.department.projects) (f' in p'.project.fundings)
    with d.deptno = d'.department.deptno and d.deptname = d'.department.deptname
      and d.mgrno = d'.department.mgrno and d.location = d'.department.location
      and p.projno = p'.project.projno and p.projname = p'.project.projname
      and p.prstdate = p'.project.prstdate and p.prenddate = p'.project.prenddate
      and f.fid = f'.funding.fid and f.amount = f'.funding.amount The formula m above is a constraint asserting the following: for each department record d, for each project record p and for each funding record f, that appear, respectively, in the sets "departments", "projects" and "fundings" under the root src of S, and such that these records satisfy the join conditions in the where clause, there must exist a record d' in the set "departments" under the root tgt of T, a record p' in the set "projects" of d', and a record f' in the set "fundings" of p'. The where clause of formula m includes a join condition 406 of FIG. 4, which specifies that the "deptno" field of project record p equals the "deptno" field of department record d. Similarly, the where clause includes a join condition 408, which specifies that the "projno" field of the funding record f equals the "projno" field of the project record p.

Furthermore, the records d', p', and f' are constrained by the with clause of m: the "deptno", "deptname", "mgrno" and "location" fields of d' must equal the "deptno", "deptname", "mgrno" and "location" fields of d; similarly, the "projno" field under p' must equal the "projno" field of p, and so on. The constraints of the with clause are illustrated by the arrows in FIG. 4. In general, the source element names and the target element names need not match. Also, not all source elements need to have a corresponding element in the target; similarly, not all target elements need to have a corresponding element in the source.

In this example, the schema mapping M consists of one formula, m, which is a nested tgd. In general, a schema mapping may consist of a set of such nested tgds. A full description of the language of nested tgds is provided in section 2.3.

2.3 Mapping Language: General Syntax of Nested TGDs

In general, given a schema S (the source schema) and a schema T (the target schema), a nested tgd representing a constraint relating S and T is a formula of the form:

$$\begin{aligned}&\text{for } (x_1 \text{ in } g_1^s) \ldots (x_n \text{ in } g_n^s) \\ &\quad \text{where } B_1(x_1, \ldots, x_n) \\ &\text{exists } (y_1 \text{ in } g_1^t) \ldots (y_m \text{ in } g_m^t) \\ &\quad \text{where } B_2(y_1, \ldots, y_m) \\ &\text{with } (e_1^s = e_1^t) \text{ and } \ldots \text{ and } (e_k^s = e_k^t)\end{aligned}$$

where:

1) $x_1, \ldots, x_n, y_1, \ldots, y_n$ are variables. (Other symbols for variables are x, y, z, $z_1$, etc.)

2) $e_1^s, \ldots e_k^s, e_1^t, \ldots, e_k^t$ are expressions, where in general expressions are defined by the following grammar: e ::=x|r|e.A (i.e., an expression can be a variable, a schema root, or a record component of another expression). In the nested tgd above, $e_1^s, \ldots e_k^s$ are source expressions, that is, they are required to use only variables from the for clause (i.e., $x_1, \ldots, x_n$) and schema roots from the source schema S. Moreover, $e_1^t, \ldots e_k^t$ are target expressions, that is, they are required to use only variables from the exists clause (i.e., $y_1, \ldots, y_m$) and schema roots from the target schema T. Furthermore, all the expressions that appear in the with clause must be of atomic type.

3) $g_1^s, \ldots g_n^s, g_1^t, \ldots, g_m^t$ are generators, where in general a generator is defined by the following grammar: g ::=$e_1$|case $e_2$ of A where $e_1$ is an expression of set type and $e_2$ is an expression of a choice type that must include the choice of an A component. In the general nested tgd above, $g_1^s, \ldots g_n^s$ are source generators; that is, they are required to use only variables from the for clause (i.e., $x_1, \ldots, x_n$) and schema roots from the source schema S. Moreover, $g_1^t, \ldots g_k^t$ are target generators; that is, they are required to use only variables from the exists clause (i.e., $y_1, \ldots, y_m$) and schema roots from the target schema T. Furthermore, for every i from 1 to n, the ith source generator in the for clause can only use (i.e., depend upon) variables $x_1, \ldots, x_{i-1}$, or one of the roots in the source schema. Similarly, for every j from 1 to m, the jth target generator in the exists clause can only use (i.e., depend upon) variables $y_1, \ldots, y_{j-1}$, or one of the roots in the source schema.

4) $B_1(x_1, \ldots, x_n)$ and $B_2(y_1, \ldots, y_m)$ are predicates of the form ($e_1=e_1'$) and ... and ($e_r=e_r'$) where $e_1, e_1', \ldots, e_r, e_r'$ are expressions of atomic type. $B_1(x_1, \ldots, x_1)$ is called a source predicate, as these expressions can be only source expressions. $B_2(y_1, \ldots, y_m)$ is called a target predicate, as these expressions can be only target expressions.

The formula m presented above is an example of a nested tgd over the schemas S and T.

It can be verified that, as a consequence of the above definition, every nested tgd m is well-formed, in the following sense. Assume that m contains in its for clause a generator $g_i$ of the form $x_i$ in $e_i$ where $e_i$ is a source expression of set type T1; moreover assume that T1 is not a top-level set type in the source schema, that is, there exists at least one more set type T1' such that T1 is nested inside T1'. Then m must also contain a generator $g_j$, with j<i, in its for clause, such that $g_j$ is of the form $x_j$ in $e_j$ where $e_j$ is of type T1'. A similar condition holds for the exists clause and target generators.

3. Query Generation Algorithm

3.1 Algorithm Introduction

The present invention provides a novel query generation algorithm that, given a schema mapping specification, generates transformation scripts that produce XML output that is guaranteed to be free of duplicate element instances and is guaranteed to satisfy minimal union requirements (i.e., the output is in PNF). The transformation scripts can be in SQL/XML, in XSLT, or in any other transformation language with features that remove or facilitate removal of duplicate element instances.

The algorithm generates a query that is a sequence of two queries (or parts) Q1 and Q2. The final result is obtained by running Q2 on top of the result of running Q1. The first query Q1 generates a flat representation of the output in which each collection of element instances is represented by a system generated ID, and each element instance contains the ID of the collection to which it is supposed to belong. The second query provides a fast reconstruction of the hierarchical structure of the target by joining element instances based on their IDs (i.e., joining parent collections with the corresponding children element instances based on IDs). The final result is free of duplicates and merged according to the minimal union semantics. Moreover, since the queries do not contain nested subqueries, they can be executed faster than in the prior art.

3.2 Algorithm Steps & Example

Figure 5:
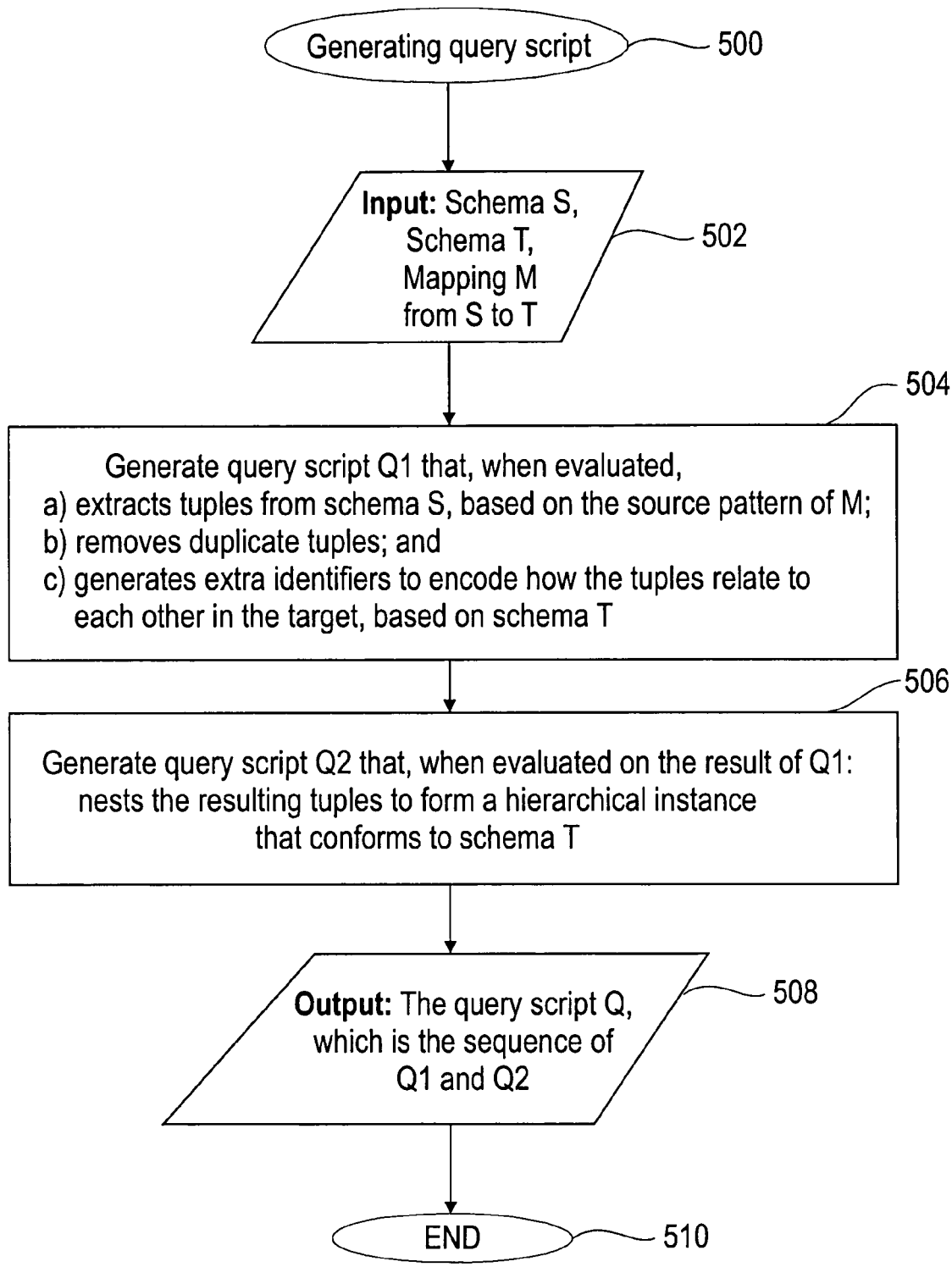
FIG. 5 is a flow chart of a method for generating a query implementing a schema mapping, in accordance with embodiments of the present invention.

A flowchart of the query generation algorithm is shown in FIG. 5. A detailed description of the steps of the algorithm follows. As the steps of the algorithm are described, an example is also presented. Hereinafter, this example is referred to as the corresponding example. The corresponding example generates a SQL/XML transformation script according to the algorithm, and relative to the schema mapping M, source schema S and target schema T described above. The query generation method begins at step 500. Input 502, a first step 504 (hereinafter, simply "Step 1"), a second step 506 (hereinafter, simply "Step 2"), and output 508 are described below, and the query generation method ends at step 510.

Input. Input 502 of the method of FIG. 5 includes schema mapping M expressed as constraints in the language of nested tgds. The schema mapping M is a set of one or more nested tgds that relate a schema S and a schema T, which are also included in the input.

Output. Output 508 is query $Q_M$ that implements the schema mapping M, and for each source instance I that conforms to schema S, returns a target instance J with the following properties: J conforms to schema T, is free of duplicates, and is in partitioned normal form (PNF).

Step 1. In Step 1, the target schema T is traversed in pre-order (i.e., visit the parent before its children). For each encountered element E that is of set type, Step 1 computes a query $Q_E$ as explained in the following substeps.

For the corresponding example, there are three elements of set type in the target schema: "departments", "projects", and "fundings". The order in which these elements are processed by the substeps of Step 1 is: "departments" followed by "projects, and finally "fundings."

Steps 1.1 and 1.2 are substeps of Step 1.

Step 1.1. In Step 1.1, all nested tgds in M that are relevant for E are found. A nested tgd is relevant for element E if one of the nested tgd's target generators in an exists clause mentions E. The nested tgds found in Step 1.1 are labeled $m_1, \ldots, m_k$.

In the corresponding example, there is one nested tgd, m, which is relevant for all of the three set type elements encountered in the traversal of Step 1, since m mentions departments, projects, and fundings in its exists clause.

Step 1.2. In Step 1.2, the query $Q_E$ is constructed as the union $t_1 \cup \ldots \cup t_k$ of query terms, one term for each nested tgd found in the Step 1.1.

For the corresponding example, the query for "departments" consists of one query term, since there is only one relevant nested tgd. Similarly, since there is only one nested tgd relevant for the other two set type elements found in Step 1, the queries for the other two set type elements each consist of one query term.

The construction of the query terms is detailed in the following Steps 1.2.1, 1.2.2 and 1.2.3 (i.e., substeps of Step 1.2).

Step 1.2.1. In Step 1.2.1, each query term $t_i$, with i from 1 to k, is obtained from $m_i$ as a query of the form:

select distinct . . . from . . . where . . .

where:

(a) the contents of the from clause correspond to the source generators that appear in the for clause of $m_i$;

(b) the contents of the where clause correspond to the first where clause of $m_i$, if the first where clause of $m_i$ is non-empty; otherwise the contents are empty; and (c) the select distinct clause specifies a return record (or tuple) that consists of an expression e for each atomic element A that is directly reachable from E.

The expression e is the corresponding source expression for A that appears in the with clause of $m_i$, if one exists, or else is a Skolem function. This Skolem function includes as parameters all the other (i.e., non Skolem) expressions that are put in the select distinct clause at Step 1.2.1.

For the corresponding example, the query for "departments" $Q_{departments}$ is shown below as it appears after Step 1.2.1 is performed:

```
Q_departments:
    select distinct
        d.deptno as department_deptno,
        d.deptname as department_deptname,
        d.mgrno as department_mgrno,
        d.location as department_location
    from src.departments d, src.projects p, src.fundings f
    where p.deptno = d.deptno and f.projno = p.projno
```

Each expression (e.g., d.deptname) that appears in the select distinct clause is given a unique attribute name (e.g., department_deptname) to identify it in subsequent processing. When executed, the above query returns a set of records such as {Rcd [department_deptno="B01", department_deptname="PLANNING", department_mgrno="000020", department_location="1510 Main St, Lancaster Pa., 17608"], . . . }.

Note that the distinct keyword of SQL is used to ensure that all duplicate departments are eliminated. In other languages, this capability may be implemented using different constructs. For example, if the target language is XSLT, a key can be assigned to each distinct record and in a subsequent processing step, only the first of all the records that have the same key are retained for further processing.

Similarly, for the other two set-type elements in the corresponding example, the following two queries $Q_{projects}$ and $Q_{fundings}$ are also generated in response to Step 1.2.1.

```
Q_projects:
    select distinct
        p.projno as project_projno,
        p.projname as project_projname,
        p.prstdate as project_prstdate,
        p.prenddate as project_prenddate
    from src.departments d, src.projects p, src.fundings f
    where p.deptno = d.deptno and f.projno = p.projno
Q_fundings:
    select distinct
        f.fid and funding_fid,
        f.amount as funding_amount,
    from src.departments d, src.projects p, src.fundings f
    where p.deptno = d.deptno and f.projno = p.projno
```

Step 1.2.2. In Step 1.2.2, extra expressions are added to the select distinct clause of the query term $t_i$ to create a "SetId" identifier for each nested set that can exist under the element E according to schema T. The "SetId" identifier is created by using a Skolem function that includes as parameters all the expressions that were created in Step 1.2.1(c) that are not Skolem functions. Thus, the created SetId identifier is unique for each combination of the atomic components, which are not Skolem functions, and which are mapped from the source.

For the corresponding example, the query for "departments", $Q_{departments}$, is changed to be the following, after Step 1.2.2:

```
Q_departments:
    select distinct
        d.deptno as department_deptno,
        d.deptname as department_deptname,
        d.mgrno and department_mgrno,
        d.location as department_location,
        VARCHAR('Sk_projects(' || d.deptno || ',' || d.deptname || ','
```

```
   || d.mgrno || ',' || d.location || ')') AS SetId0
from src.departments d, src.projects p, src.fundings f
where p.deptno = d.deptno and f.projno = p.projno
```

In the above query generated by Step 1.2.2, since there is a set-type element ("projects") that is nested inside each department, a SetId0 identifier is created for the nested set. The string 'Sk_projects' is the name of the Skolem function for the SetId0 identifier. This Skolem function name is uniquely generated by the system, for each set-type element in the target schema.

Similarly, the query for "projects", $Q_{projects}$, is also changed in Step 1.2.2 to add a SetId identifier to account for the nested set of findings:

```
Q_projects:
   select distinct
      p.projno as project_projno,
      p.projname as project_projname,
      p.prstdate as project_prstdate,
      p.prenddate as project_prenddate,
      VARCHAR('Sk_fundings(' || p.projno || ',' || p.projname || ','
         || p.prstdate || ',' || p.prenddate || ')') AS SetId0
   from src.departments d, src.projects p, src.fundings f
   where p.deptno = d.deptno and f.projno = p.projno
```

For the third set-type element in the example, "fundings", the query $Q_{fundings}$ generated in the previous step does not need to be changed in Step 1.2.2 since there are no further set-type elements that are nested within a finding record.

Step 1.2.3. Step 1.2.3 operates under the condition that E is not a top-level set-type element, (i.e., E is nested within another element P of the target schema that is also of set type). Under this condition, a query $Q_P$ must have been generated for element P, since P is an ancestor of E. This query $Q_P$ necessarily includes a term $p_i$ for the nested tgd $m_i$. By the well-formedness of nested tgds, since $m_i$ refers to E, $m_i$ must refer to P as well. Furthermore, since E is nested inside P, the query term $p_i$ must include a "SetId" identifier (hereinafter, the above-mentioned "SetId" identifier) for E, generated in the execution of Step 1.2.2 for P and $m_i$. Step 1.2.3 performs the following:

(a) add the above-mentioned "SetId" identifier to the select distinct clause of the query term $t_i$. The attribute name under which this identifier is added to the select distinct clause is "InSet".

(b) add the above-mentioned "SetId" identifier to the list of parameters for all the Skolem functions that were created in Step 1.2.2.

(c) add the above-mentioned "SetId" identifier to each of the Skolem functions generated in Step 1.2.1(c).

For the corresponding example, the set-type element "projects" is not a top-level set-type element in the target schema, so Step 1.2.3 applies to this element. This element is nested inside the set-type element "departments", for which a query $Q_{departments}$ has been generated above. The expression that appears in the position of the SetId0 identifier in $Q_{departments}$ is the following:

VARCHAR('Sk_projects('||d.deptno||','||d.deptname||', '||d.mgrno||','||d.location||')')

This expression is added in the above Step 1.2.3(a) to the select distinct clause of $Q_{projects}$, under the attribute name "InSet". This expression, as added in Step 1.2.3(a), will be later used to nest accordingly project records inside the corresponding departments. Furthermore, the above expression is also added in Step 1.2.3(b) to the list of parameters for the Skolem function created in Step 1.2.2 for the SetId0 identifier that appears in $Q_{projects}$. Since there are no Skolem functions created in Step 1.2.1(c) for $Q_{projects}$, nothing needs to be done for Step 1.2.3(c). After performing Step 1.2.3, the resulting $Q_{projects}$ is the following:

```
Q_projects:
   select distinct
      p.projno as project_projno,
      p.projname as project_projname,
      p.prstdate as project_prstdate,
      p.prenddate as project_prenddate,
      VARCHAR('Sk_fundings(' || p.projno || ',' || p.projname || ','
         || p.prstdate || ',' || p.prenddate || ',' || 'Sk_projects(' || d.deptno
         || ',' || d.deptname || ',' || d.mgrno || ',' || d.location || ')' || ')')
         AS SetId0,
      VARCHAR('Sk_projects(' || d.deptno || ',' || d.deptname ||
         ',' || d.mgrno || ',' || d.location || ')') AS InSet
   from src.departments d, src.projects p, src.fundings f
   where p.deptno = d.deptno and f.projno = p.projno
```

Similarly, Step 1.2.3(a) applies to the query $Q_{fundings}$ generated in Step 1.2.1, and the resulting query $Q_{fundings}$ is shown below. The expression used to create the "InSet" identifier is the same expression used in $Q_{projects}$ above to create the SetId0 identifier. Nothing needs to be done for Steps 1.2.3(b) and (c) for $Q_{fundings}$ since there are no Skolem functions in it.

```
Q_fundings:
   select distinct
      f.fid as funding_fid,
      f.amount as funding_amount,
      VARCHAR('Sk_fundings(' || p.projno || ',' || p.projname || ','
         || p.prstdate || ',' || p.prenddate || ',' || 'Sk_projects(' || d.deptno
         || ',' || d.deptname || ',' || d.mgrno || ',' || d.location || ')' || ')')
         AS InSet
   from src.departments d, src.projects p, src.fundings f
   where p.deptno = d.deptno and f.projno = p.projno
```

At this point, Step 1 is completed for the corresponding example. The three queries obtained at the end of Step 1 are shown in FIG. 6 as a set of queries 600. Queries $Q_{departments}$, $Q_{projects}$ and $Q_{fundings}$ at the completion of Step 1 are shown, respectively, as queries 602, 604 and 606 in FIG. 6.

To illustrate the case when there is more than one $t_i$ for the union in Step 1.2., consider a variation of the corresponding example, where there is an additional data source (e.g., a schema with root $src_1$) containing information about departments, employees and projects. In this data source, each project has a manager who is an employee working for some department. The data about departments and projects in the additional source schema is similar to the data about department and projects in the previous source schema. The following nested tgd $m_1$ specifies how such projects with the related department information map into the same target as before (i.e., schema with root tgt). This nested tgd $m_1$ is in addition to the earlier nested tgd m.

```
m₁: for (p in src₁.projects) (e in src₁.employees) (d in src₁.departments)
        where p.mgrno = e.empno and e.deptno = d.deptno
    exists (d' in tgt.departments) (p' in d'.department. projects)
    with d.deptno = d'.department.deptno and d.deptname =
            d'.department.deptname
        and d.mgrno = d'.department.mgrno and d.location =
            d'.department.location
        and p.projno = p'.project.projno and p.projname =
            p'.project.projname
```

-continued

```
        and p.prstdate = p'.project.prstdate and p.prenddate =
            p'.project.prenddate
```

In this variation of the corresponding example, the following query $Q_{departments}$ that is constructed in Step 1.2 consists of a union of two terms, where the first term is the same as $Q_{departments}$ constructed in the corresponding example in Step 1.2.2.

```
Q_departments:
    select distinct
        d.deptno as department__deptno,
        d.deptname as department__deptname,
        d.mgrno as department__mgrno,
        d.location as department__location,
        VARCHAR('Sk__projects(' || d.deptno || ',' || d.deptname || ',' || d.mgrno || ',' || d.location ||
    ')') AS SetId0
    from src.departments d, src.projects p, src.fundings f
    where p.deptno = d.deptno and f.projno = p.projno
    union
    select distinct
        d.deptno as department__deptno,
        d.deptname as department__deptname,
        d.mgrno as department__mgrno,
        d.location as department__location,
        VARCHAR('Sk__projects(' || d.deptno || ',' || d.deptname || ',' || d.mgrno || ',' || d.location ||
    ')') AS SetId0
    from src₁.projects p, src₁.employees e, src₁.departments d
    where p.mgrno = e.mgrno and e.deptno = d.deptno
```

Similarly the following query $Q_{projects}$ that is constructed in Step 1.2 consists of a union of two terms, where the first term is the same as query $Q_{projects}$ constructed in the corresponding example in Step 1.2.3.

```
Q_projects:
    select distinct
        p.projno as project__projno,
        p.projname as project__projname,
        p.prstdate as project__prstdate,
        p.prenddate as project__prenddate,
        VARCHAR('Sk__fundings(' || p.projno || ',' || p.projname || ',' || p.prstdate || ',' || p.prenddate
    || ',' || 'Sk__projects(' || d.deptno || ',' || d.deptname || ',' || d.mgrno || ',' || d.location || ')' || ')')
    AS SetId0,
        VARCHAR('Sk__projects(' || d.deptno || ',' || d.deptname || ',' || d.mgrno || ',' || d.location ||
    ')') AS InSet
    from src.departments d, src.projects p, src.fundings f
    where p.deptno = d.deptno and f.projno = p.projno
    union
    select distinct
        p.projno as project__projno,
        p.projname as project__projname,
        p.prstdate as project__prstdate,
        p.prenddate as project__prenddate,
        VARCHAR('Sk__fundings(' || p.projno || ',' || p.projname || ',' || p.prstdate || ',' || p.prenddate
    || ',' || 'Sk__projects(' || d.deptno || ',' || d.deptname || ',' || d.mgrno || ',' || d.location || ')' || ')')
    AS SetId0,
        VARCHAR('Sk__projects(' || d.deptno || ',' || d.deptname || ',' || d.mgrno || ',' || d.location ||
    ')') AS InSet
    from src₁.projects p, src₁.employees e, src₁.departments d
    where p.mgrno = e.mgrno and e.deptno = d.deptno
```

The query $Q_{fundings}$ that is constructed in Step 1.2. is the same as $Q_{fundings}$ constructed in the corresponding example above, since the new nested tgd $m_1$ is not relevant for fundings (i.e., does not refer to fundings in the exists clause).

Step 2. Step 2 of the query generation process of FIG. 5 includes substeps 2.1 and 2.2, as described below.

Step 2.1. Step 2.1 consists of a repetition of the following substep 2.1.1 for each of the top-level set type elements in the target schema. For the target schema of the corresponding example, there is only one such element: "departments".

Step 2.1.1. Step 2.1.1 is a recursive step starting with the top-level set type element E that is to be processed (e.g., "departments" in the corresponding example), and proceeding, recursively, to set type elements that are nested below E. Thus, for the corresponding example, in a recursive application of Step 2.1.1, E is "projects" and then "findings" (although in the first application of Step 2.1.1, E is "departments").

Let $Q_E$ be the query computed in Step 1 and $E_1, \ldots E_p$ be all the elements of set type that are below E with no intermediate elements of set type in between.

For the corresponding example, if E is the set type element "fundings," then there are no elements of set type nested below it. In contrast, if E is "projects," then there is one set type element nested below it, namely "fundings." If E is "departments," then there is one set type element below it, namely "projects."

Step 2.1.1 generates query $Q'_E$ that, for each record u returned by $Q_E$, constructs an element instance E whose subcomponents are constructed as follows:

For every atomic component A that is directly reachable from E, its value is specified by the corresponding column of u.

For every nested set-type subcomponent $E_i$ of E, where $E_i$ is one of $E_1, \ldots, E_p$, the following substeps are applied:

(a) Find the "SetId" identifier for the $E_i$ subcomponent from the tuple U of $Q_E$.

(b) Generate a query $Q'_{Ei}$ for the element $E_i$ by recursively calling Step 2.1.1 for element $E_i$.

(c) Generate an aggregating subquery to compute the set of element instances that will form the value of the $E_i$ subcomponent of E. This subquery calls the query $Q'_{Ei}$ and filters the tuples resulting from the call of query $Q'_{Ei}$ to retain only those tuples whose "InSet" value matches the "SetId" identifier found in Step (a) above. This filtering of tuples guarantees that the minimal union (PNF) semantics is implemented correctly.

In addition, if E is not a top-level set-type element, the query $Q'_E$ also returns, unchanged, the InSet attribute of $Q_E$.

For the corresponding example, if E is "findings", Step 2.1.1 constructs the following query $Q'_{findings}$, which is also depicted as query 702 in FIG. 7A:

```
Q'fundings:
   select
      u.InSet as InSet,
      xml2clob(
         xmlelement (name "funding",
            xmlelement (name "fid", u.funding_fid),
            xmlelement (name "amount", u.funding_amount)
         )) as XML
   from Qfundings u
```

Note that in this case, there is no need for the above Steps 2.1.1(a), (b) and (c), since there are no nested set type elements under "fundings."

In the case in which E is "projects," Step 2.1.1 constructs the following query $Q'_{projects}$, which is also depicted as query 704 in FIG. 7A:

```
Q'projects:
   select
      u.InSet as InSet,
      xml2clob(
         xmlelement (name "project",
            xmlelement (name "projno", u.project_projno),
            xmlelement (name "projname", u.project_projname),
            xmlelement (name "prstdate", u.project_prstdate),
            xmlelement (name "prenddate", u.project_prenddate),
            xmlelement (name "fundings",
               (select xmlagg (v.XML)
                from Q'fundings v
                where v.InSet = u.SetId0))
         )) as XML
   from Qprojects u
```

In this case, Steps 2.1.1(a), (b) and (c) are applicable, since "projects" has a nested set type element, "fundings." Step 2.1.1(a) finds the expression that gives the SetId identifier for the nested set. This expression is u.SetId0. In Step 2.1.1(b), the query $Q'_{fundings}$ is generated. This query $Q'_{fundings}$ is the same query shown above for the case in which E is "fundings." In Step 2.1.1(c), the following aggregating subquery is issued:

```
(select xmlagg (v.XML)
 from Q'fundings v
 where v.InSet = u.SetId0)
```

The above aggregating subquery groups relevant funding elements under the "findings" element of each project element.

A similar process generates the following query $Q'_{departments}$ for "departments." The difference in this query is that the nested set type element is "projects." Furthermore, since "departments" is a top-level set type element, there is no need to return an InSet value in the select clause. $Q'_{departments}$ is also depicted as query 706 in FIG. 7B.

```
Q'departments:
   select
      xml2clob(
         xmlelement (name "department",
            xmlelement (name "deptno", u.department_deptno),
            xmlelement (name "deptname",
               u.department_deptname),
            xmlelement (name "mgrno", u.department_mgrno),
            xmlelement (name "location", u.department_location),
            xmlelement (name "projects",
               (select xmlagg (v.XML)
                from Q'projects v
                where v.InSet = u.SetId0))
         )) as XML
   from Qdepartments u
```

Step 2.2. Step 2.2 generates a wrapping top-level query shown below (see also query 708 of FIG. 7B). The wrapping top-level query generates the root element of the target schema and includes appropriate calls to the top-level queries $Q'_E$ generated in Step 2.1.1 above.

```
select xml2clob(
    xmlelement (name "tgt",
        xmlelement (name "departments",
            Table0.XML)
    ))
from
(select xmlagg (u.XML) as XML
from Q'$_{departments}$ u
) as Table0
```

For the corresponding example, there is one top-level query, $Q'_{departments}$. The Step 2.2 query is called, resulting in a set of "department" elements being aggregated under the "departments" element, which in turn is nested under the root "tgt." This query call generates the final instance (e.g., an XML document) which is free of duplicates and satisfies the minimal union (PNF) requirements.

The queries generated at the end of Step 2 are included in FIGS. 7A and 7B. The entire query script (i.e., the sequence of the queries in FIGS. 6, 7A and 7B) can be run on a database such as a DB2® database, where the intermediate queries (i.e., the ones that have a name, such as $Q_{departments}$, etc.) are enclosed in a with clause so that they can used by the subsequent queries. A DB2® database is available from International Business Machines Corporation.

3.3 Minimal Union with Multiple Data Sources

An important feature of the algorithm is that the generated query script can perform the minimal union of data that is coming from multiple data sources. For example, suppose that there is another database with information about departments, projects, etc. This database could also be mapped into the same target schema by using an additional nested tgd in the schema mapping. If the same department occurs in the two databases with exactly the same components, then the query script that is generated from the two nested tgds will merge the two corresponding sets of projects for the two occurrences of the department in the two databases. Furthermore, if there are common projects for the given department in the two databases, then this merging is done recursively (e.g., fundings are merged, etc.).

4. Computer System

Figure 8:
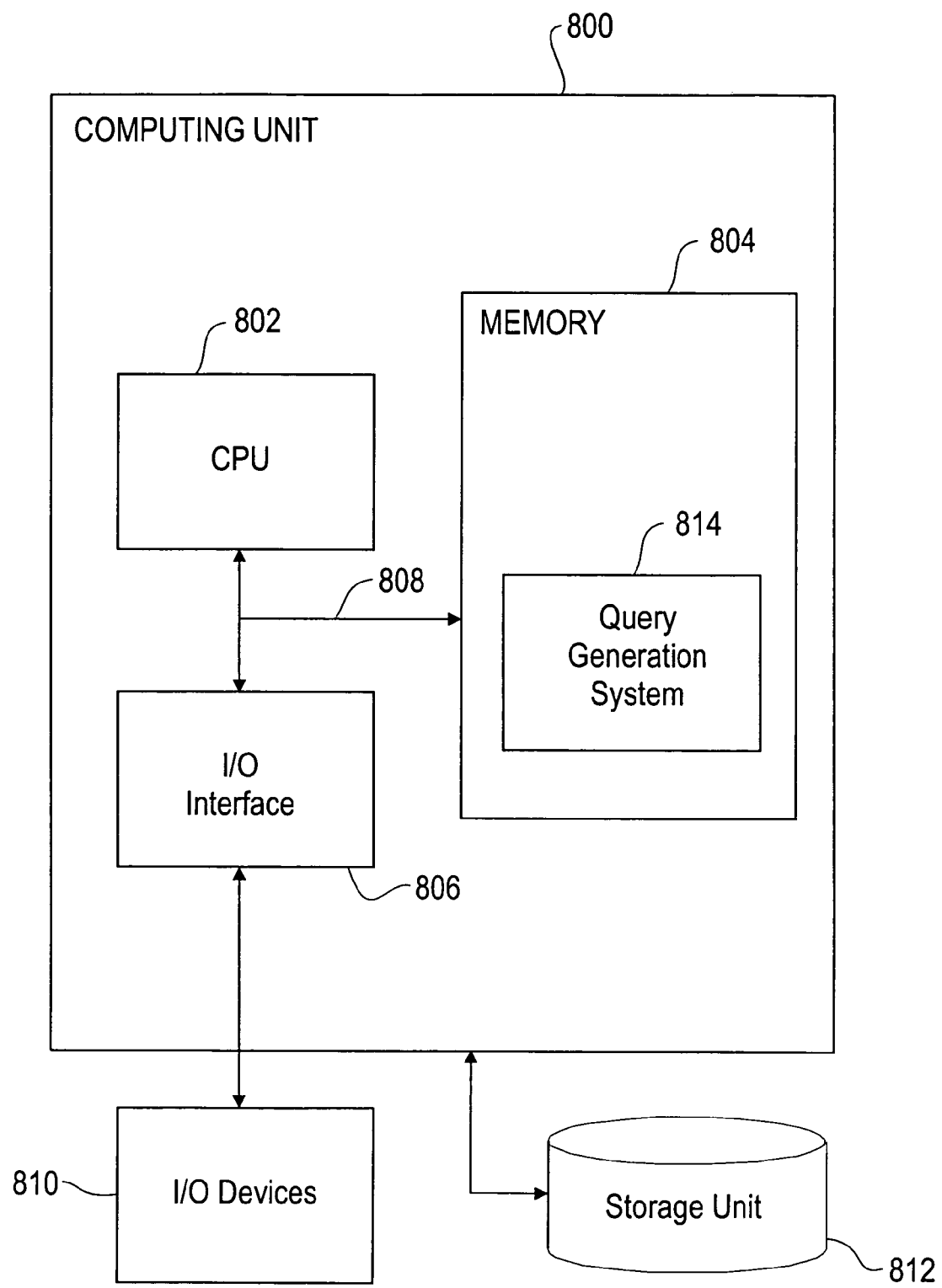
FIG. 8 is a block diagram of a computer system for implementing the method of FIG. 5, in accordance with embodiments of the present invention.

FIG. 8 is a block diagram of a computing unit 800 for implementing the method of FIG. 5, in accordance with embodiments of the present invention. Computing unit 800 generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server). Memory 804 may comprise any known type of data storage and/or transmission media, including magnetic media, optical media, random access memory (RAM), read-only memory (ROM), a data cache, a data object, etc. Storage unit 812 is, for example, a magnetic disk drive or an optical disk drive. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device, such as a non-volatile storage device (e.g., a CD-ROM drive which receives a CD-ROM disk) (not shown). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

Memory 804 includes computer program code comprising a query generation system 814 that generates schema mapping-based queries that provide instances of target schemas that are without duplicate elements and satisfy PNF requirements. Query generation system 814 implements logic of the process of FIG. 5. Further, memory 804 may include other systems not shown in FIG. 8, such as an operating system (e.g., Linux) that runs on CPU 802 and provides control of various components within and/or connected to computing unit 800.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 814 for use by or in connection with a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk—read-only memory (CD-ROM), compact disk—read/write (CD-R/W) and DVD.

A computing system 800 suitable for storing and/or executing program code 814 includes at least one processor 802 coupled directly or indirectly to memory elements 804 through a system bus 808. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 800, wherein the code in combination with computer system 800 is capable of providing and facilitating the features of the present invention. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of generating a query implementing a schema mapping in a computing environment, said method comprising:

providing a mapping M from a schema S to a schema T, said mapping M relating said schema S to said schema T, said mapping M expressed as a plurality of constraints included in a set D of one or more nested tuple-generating dependencies that relate said schema S to said schema T, said schema S comprising a first set of one or more elements and said schema T comprising a second set of one or more elements, wherein said schema T includes at least one set type element;

traversing, in pre-order, each set type element that is included in said second set of one or more elements of said schema T, wherein said traversing includes visiting an element E of said second set of one or more elements;

identifying at least one nested tuple-generating dependency (nested tgd)$m_1, \ldots, M_k$ of said set D, wherein a target generator of a plurality of target generators of a nested tgd $m_i$ of said $m_1, \ldots, m_k$ includes said element E, wherein said $m_i$ is of a form:

for $(x_1$ in $g_1^s) \ldots (x_n$ in $g_n^s)$
where $B_1(x_1, \ldots, x_n)$
exists $(y_1$ in $g_1^t) \ldots (y_m$ in $g_m^t)$
where $B_2(y_1, \ldots, y_m)$
with $(e_1^s = e_1^t)$ and $\ldots$ and $(e_k^{s = e_k^s} = e_k^t)$, wherein $x_1, \ldots, x_n$ and $y_1, \ldots, y_m$ are variables, wherein $e_1^s, \ldots, e_k^s$ are plurality of source expressions of atomic type, wherein $e_1^t, \ldots, e_k^t$ are a plurality of target expressions of atomic type, wherein each expression of said plurality of source expressions and said plurality of target expressions is a variable, a schema root, or a record component of another source expression, wherein said $g_1^s, \ldots g_n^s$ are a plurality of source generators, wherein said $g_1^t, \ldots, g_m^t$ are said plurality of target generators, wherein an i-th source generator $g_i^S$ of said plurality of source generators $g_1^s, \ldots, g_n^s$ depends upon a first root of one or more roots of said schema S or upon variables $x_1, \ldots, x_{i-1}$ of said variables $x_1, \ldots, x_n$, wherein a j-th target generator $g_i^t$ of said plurality of target generators $g_1^t, \ldots, g_m^t$ depends upon a second root of said one or more roots of said schema S or upon variables $y_1, \ldots, y_{j-1}$, wherein $B_1(x_1, \ldots, x_n)$ is a source predicate, and wherein $B_2(y_1, \ldots, y_m)$ is a target predicate;

for each m of said $m_1, \ldots, m_k$, obtaining a query terms $t_1, \ldots, T_k$, wherein said obtaining said query term $t_i$ includes constructing a select distinct clause, a from clause, and a where clause as said query term $t_i$ wherein said select distinct clause specifies a return tuple that includes one or more expressions, wherein each expression of said one or more expressions is a source expression of said plurality of source expressions $e_1^s, \ldots, e_k^s$ if said source expression is associated with an atomic element A of said one or more atomic elements, or a first Skolem function that includes any expression included in said select distinct clause that is not a Skolem function if no source expression of said plurality of source expressions is associated with said atomic element A;

constructing a first SetId identifier that includes a second Skolem function, wherein said second Skolem function includes, as one or more parameters therein, each expression of said one or more expressions that is not said first Skolem function;

adding said first SetId identifier to said select distinct clause of said query term $t_i$;

adding a second SetId identifier to said select distinct clause of said query term $t_i$ if said element E is not a top-level set type element, wherein said second SetId identifier is a SetId identifier of an element P, and wherein said element P is an ancestor of said element E in said schema T;

adding said second SetId identifier to said one or more parameters included in said second Skolem function included in said select distinct clause of said query term $t_i$ if said element E is not said top-level set type element;

adding said second SetId identifier to said first Skolem function if said element E is not said top-level set type element and if said select distinct clause of said query term $t_i$ includes said first Skolem function;

generating a query Q1 as a union of said query terms $t_1, \ldots, t_k$ subsequent to said obtaining a query term $t_i$ for each $m_1$ of said $m_i, \ldots, m_k$;

generating a query Q2 that nests a plurality of tuples resulting from an evaluation of said query Q1;

generating a query Q capable of implementing said mapping M, wherein said query Q is a sequence of said query Q1 followed by said query Q2;

storing said query Q in a data storage unit;

applying said query Q to an input, wherein a result of said applying is an instance J in which no element instance of said instance J is a duplicate of another element instance of said instance J, wherein said instance J conforms to schema T, wherein said input is an instance I conforming to said schema S, wherein said instance I and said instance J satisfy said plurality of constraints of said mapping M, and wherein said instance J is in partitioned normal form (PNF).

2. The method of claim 1, wherein said generating said query Q includes generating said query Q in a generic query language that is capable of being directly translated into any external query language that supports a removal of any duplicate element instances from said instance J, or that supports an assignment of a key to distinct element instances of said instance J.

3. The method of claim 1, wherein said generating said query Q2 comprises:

identifying a set type element E of said at least one set type element, wherein one or more set type elements $E_1, \ldots, E_p$ are nested below said set type element E with no element of set type nested between said set type element E and any one element of said $E_1, \ldots, E_p$, and wherein said query Q1 is generated based on said set type element E, and wherein said applying said query Q1 returns a tuple u;

specifying one or more atomic components as a corresponding column of said tuple u, wherein said one or more atomic components are directly reachable from said set type element E;

determining an identifier associated with a set type element $E_i$ of said $E1, \ldots, E_p$, said identifier created via a third Skolem function;

generating a query $Q_{Ei}$ associated with said set type element $E_i$, wherein said generating said query $Q_{Ei}$ includes recursively utilizing said generating said query Q2 with said set type element $E_i$; and generating a subquery that aggregates a set of instances forming a value of said set type element $E_i$, said set of said instances to be nested under said set type element E, wherein said subquery calls query $Q_{Ei}$ and filters one or more tuples returned by said subquery to be a set of one or more tuples whose InSet attribute value matches said identifier.

4. The method of claim 3, wherein said generating said query Q2 further comprises:

determining that said set type element E is not a top-level set type element; and in response to said determining that said set type element E is not a top-level set type element, adding an InSet attribute of said query Q1.

5. A computing system comprising a processor and a computer-readable memory unit coupled to said processor, said memory unit containing instructions that when executed by said processor implement a method of generating a query implementing a schema mapping in a computing environment, said method comprising:

providing a mapping M from a schema S to a schema T, said mapping M relating said schema S to said schema T, said mapping M expressed as a plurality of constraints included in a set D of one or more nested tuple-generating dependencies that relate said schema S to said schema T, said schema S comprising a first set of one or more elements and said schema T comprising a second set of one or more elements, wherein said schema T includes at least one set type element;

traversing, in pre-order, each set type element that is included in said second set of one or more elements of said schema T, wherein said traversing includes visiting an element E of said second set of one or more elements;

identifying at least one nested tuple-generating dependency (nested tgd) $m_1, \ldots, m_k$ of said set D, wherein a target generator of a plurality of target generators of a nested tgd $m_i$ of said $m_1, \ldots, m_k$ includes said element E, wherein said $m_i$ is of a form:

for $(x_1$ in $g_1^s) \ldots (x_n$ in $g_n^s)$
where $B_1(x_1, \ldots, x_n)$
exists $(y_1$ in $g_1^t) \ldots (y_m$ in $g_m^t)$
where $B_2(y_1, \ldots, y_m)$
with $(e_1^s = e_1^t)$ and $\ldots$ and $(e_k^s = e_k^t)$ wherein $x_1, \ldots, x_n$ and $y_1, \ldots, y_m$ are variables, wherein $e_1^s, \ldots, e_k^s$ are plurality of source expressions of atomic type, wherein $e_1^t, \ldots, e_k^t$ are a plurality of target expressions of atomic type, wherein each expression of said plurality of source expressions and said plurality of target expressions is a variable, a schema root, or a record component of another source expression, wherein said $g_1^s, \ldots, g_n^s$ are a plurality of source generators, wherein said $g_1^t, \ldots, g_m^t$ are said plurality of target generators, wherein an i-th source generator $g_i^s$ of said plurality of source generators $g_1^s, \ldots, g_n^s$ depends upon a first root of one or more roots of said schema S or upon variables $x_1, \ldots, x_{i-1}$ of said variables $x_1, \ldots, x_n$, wherein a j-th target generator $g_j^t$ of said plurality of target generators $g_1^t, \ldots, g_m^t$ depends upon a second root of said one or more roots of said schema S or upon variables $y_1, \ldots, y_{j-1}$, wherein $B_1(x_1, \ldots, x_n)$ is a source predicate, and wherein $B_2(y_1, \ldots, y_m)$ is a target predicate;

for each m of said $m_1, \ldots, m_k$, obtaining a query terms $t_1, \ldots, T_k$, wherein said obtaining said query term $t_i$ includes constructing a select distinct clause, a from clause, and a where clause as said query term $t_i$ wherein said select distinct clause specifies a return tuple that includes one or more expressions, wherein each expression of said one or more expressions is a source expression of said plurality of source expressions $e_1^s, \ldots, e_k^s$ if said source expression is associated with an atomic element A of said one or more atomic elements, or a first Skolem function that includes any expression included in said select distinct clause that is not a Skolem function if no source expression of said plurality of source expressions is associated with said atomic element A;

constructing a first SetId identifier that includes a second Skolem function, wherein said second Skolem function includes, as one or more parameters therein, each expression of said one or more expressions that is not said first Skolem function;

adding said first SetId identifier to said select distinct clause of said query term $t_i$;

adding a second SetId identifier to said select distinct clause of said query term $t_i$ if said element E is not a top-level set type element, wherein said second SetId identifier is a SetId identifier of an element P, and wherein said element P is an ancestor of said element E in said schema T;

adding said second SetId identifier to said one or more parameters included in said second Skolem function included in said select distinct clause of said query term $t_i$ if said element E is not said top-level set type element;

adding said second SetId identifier to said first Skolem function if said element E is not said top-level set type element and if said select distinct clause of said query term $t_i$ includes said first Skolem function;

generating a query Q1 as a union of said query terms $t_1, \ldots, t_k$ subsequent to said obtaining a query term $t_i$ for each $m_i$ of said $m_1, \ldots, m_k$;

generating a query Q2 that nests a plurality of tuples resulting from an evaluation of said query Q1;

generating a query Q capable of implementing said mapping M, wherein said query Q is a sequence of said query Q1 followed by said query Q2;

storing said query Q in a data storage unit;

applying said query Q to an input, wherein a result of said applying is an instance J in which no element instance of said instance J is a duplicate of another element instance of said instance J, wherein said instance J conforms to schema T, wherein said input is an instance I conforming to said schema S, wherein said instance I and said instance J satisfy said plurality of constraints of said mapping M, and wherein said instance J is in partitioned normal form (PNF).

6. The system of claim 5, wherein said generating said query Q includes generating said query Q in a generic query language that is capable of being directly translated into any external query language that supports a removal of any duplicate element instances from said instance J, or that supports an assignment of a key to distinct element instances said instance J.

7. The system of claim 5, wherein said generating said query Q2 comprises:
- identifying a set type element E of said at least one set type element, wherein one or more set type elements $E_1, \ldots, E_p$ are nested below said set type element E with no element of set type nested between said set type element E and any one element of said $E_1, \ldots, E_p$, and wherein said query Q1 is generated based on said set type element E, and wherein said applying said query Q1 returns a tuple u;
- specifying one or more atomic components as a corresponding column of said tuple u, wherein said one or more atomic components are directly reachable from said set type element E;
- determining an identifier associated with a set type element $E_i$ of said $E_1, \ldots, E_p$, said identifier created via a third Skolem function;
- generating a query $Q_{Ei}$ associated with said set type element $E_i$, wherein said generating said query $Q_{Ei}$ includes recursively utilizing said generating said query Q2 with said set type element $E_i$; and
- generating a subquery that aggregates a set of instances forming a value of said set type element $E_i$, said set of said instances to be nested under said set type element E, wherein said subquery calls query $Q_{Ei}$ and filters one or more tuples returned by said subquery to be a set of one or more tuples whose InSet attribute value matches said identifier.

8. A computer program product comprising a computer-usable medium having a computer-readable program code stored therein, said computer-readable program code containing instructions that when executed by a processor of a computing system implement a method of generating a query implementing a schema mapping in a computing environment, said method comprising:
- providing a mapping M from a schema S to a schema T, said mapping M relating said schema S to said schema T, said mapping M expressed as a plurality of constraints included in a set D of one or more nested tuple-generating dependencies that relate said schema S to said schema T, said schema S comprising a first set of one or more elements and said schema T comprising a second set of one or more elements, wherein said schema T includes at least one set type element;
- traversing, in pre-order, each set type element that is included in said second set of one or more elements of said schema T, wherein said traversing includes visiting an element B of said second set of one or more elements;
- identifying at least one nested tuple-generating dependency (nested tgd) $m_1, \ldots, m_k$ of said set D, wherein a target generator of a plurality of target generators of a nested tgd $m_i$ of said $m_1, \ldots, m_k$ includes said element E, wherein said $m_i$ is of a form:
  - for $(x_1$ in $g_1^s) \ldots (x_n$ in $g_n^s)$
  - where $B_1(x_1, \ldots, x_n)$
  - exists $(y_1$ in $g_1^t) \ldots (y_m$ in $g_m^t)$
  - where $B_2(y_1, \ldots, y_m)$
  - with $(e_1^s = e_1^t)$ and $\ldots$ and $(e_k^s = e_k^t)$,
  wherein $x_1, \ldots, x_n$ and $y_1, \ldots, y_m$ are variables, wherein $e_1^s, \ldots, e_k^s$ are plurality of source expressions of atomic type, wherein $e_1^t, \ldots, e_k^t$ are a plurality of target expressions of atomic type, wherein each expression of said plurality of source expressions and said plurality of target expressions is a variable, a schema root, or a record component of another source expression, wherein said $g_1^s, \ldots, g_n^s$ are a plurality of source generators, wherein said $g_1^t, \ldots, g_m^t$ are said plurality of target generators, wherein an i-th source generator $g_i^s$ of said plurality of source generators $g_1^s, \ldots, g_n^s$ depends upon a first root of one or more roots of said schema S or upon variables $x_1, \ldots, x_{i-1}$ of said variables $x_1, \ldots, x_n$, wherein a j-th target generator $g_j^t$ of said plurality of target generators $g_1^t, \ldots, g_m^t$ depends upon a second root of said one or more roots of said schema S or upon variables $y_1, \ldots, y_{j-1}$, wherein $B_1(x_1, \ldots, x_n)$ is a source predicate, and wherein $B_2(y_1, \ldots, y_m)$ is a target predicate;
- for each m of said $m_1, \ldots, m_k$, obtaining a query terms $t_i$ of one or more query terms $t_1, \ldots, t_k$, wherein said obtaining said query term $t_i$ includes constructing a select distinct clause, a from clause, and a where clause as said query term $t_i$ wherein said select distinct clause specifies a return tuple that includes one or more expressions, wherein each expression of said one or more expressions is
  - a source expression of said plurality of source expressions $e_1^s, \ldots, e_k^s$ if said source expression is associated with an atomic element A of said one or more atomic elements, or
  - a first Skolem function that includes any expression included in said select distinct clause that is not a Skolem function if no source expression of said plurality of source expressions is associated with said atomic element A;
- constructing a first SetId identifier that includes a second Skolem function, wherein said second Skolem function includes, as one or more parameters therein, each expression of said one or more expressions that is not said first Skolem function;
- adding said first SetId identifier to said select distinct clause of said query term $t_i$;
- adding a second SetId identifier to said select distinct clause of said query term $t_i$ if said element E is not a top-level set type element, wherein said second SetId identifier is a SetId identifier of an element P, and wherein said element P is an ancestor of said element E in said schema T;
- adding said second SetId identifier to said one or more parameters included in said second Skolem function included in said select distinct clause of said query term $t_i$ if said element E is not said top-level set type element;
- adding said second SetId identifier to said first Skolem function if said element E is not said top-level set type element and if said select distinct clause of said query term $t_i$ includes said first Skolem function;
- generating a query Q1 as a union of said query terms $t_1, \ldots, t_k$ subsequent to said obtaining a query term $t_i$ for each $m_1$ of said $m_i, \ldots, m_k$;
- generating a query Q2 that nests a plurality of tuples resulting from an evaluation of said query Q1;
- generating a query Q capable of implementing said mapping M, wherein said query Q is a sequence of said query Q1 followed by said query Q2;
- storing said query Q in a data storage unit;
- applying said query Q to an input, wherein a result of said applying is an instance J in which no element instance of said instance J is a duplicate of another element instance of said instance J, wherein said instance J conforms to schema T, wherein said input is an instance I conforming to said schema S, wherein said instance I and said instance J satisfy said plurality of constraints of said mapping M, and wherein said instance J is in partitioned normal form (PNF).

* * * * *